US012658517B2

(12) United States Patent
Bang et al.

(10) Patent No.: US 12,658,517 B2
(45) Date of Patent: Jun. 16, 2026

(54) BATTERY MODULE AND BATTERY PACK INCLUDING THE SAME

(71) Applicant: LG ENERGY SOLUTION, LTD., Seoul (KR)

(72) Inventors: Seok Jun Bang, Daejeon (KR); Junyeob Seong, Daejeon (KR); Sunghwan Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 731 days.

(21) Appl. No.: 17/915,374

(22) PCT Filed: Mar. 4, 2021

(86) PCT No.: PCT/KR2021/002698
§ 371 (c)(1),
(2) Date: Sep. 28, 2022

(87) PCT Pub. No.: WO2021/210780
PCT Pub. Date: Oct. 21, 2021

(65) Prior Publication Data
US 2023/0178836 A1 Jun. 8, 2023

(30) Foreign Application Priority Data

Apr. 14, 2020 (KR) ........................ 10-2020-0044966

(51) Int. Cl.
*H01M 50/262* (2021.01)
*H01M 50/296* (2021.01)
*H01M 50/507* (2021.01)
(52) U.S. Cl.
CPC ....... *H01M 50/262* (2021.01); *H01M 50/296* (2021.01); *H01M 50/507* (2021.01)

(58) Field of Classification Search
CPC ............. H01M 50/262; H01M 50/296; H01M 50/507; H01M 2220/20; H01M 50/505;
(Continued)

(56) References Cited

U.S. PATENT DOCUMENTS

2008/0166600 A1    7/2008  Tanaka
2017/0012276 A1*   1/2017  Sakai .................. H01M 50/296
(Continued)

FOREIGN PATENT DOCUMENTS

CN        205294606 U     6/2016
CN        208336324 U     1/2019
(Continued)

OTHER PUBLICATIONS

Guo et al. (CN210084712U and using Machine Translation as English version) (Year: 2020).*
(Continued)

*Primary Examiner* — Wyatt P Mcconnell
*Assistant Examiner* — Joshua P Mcclure
(74) *Attorney, Agent, or Firm* — Birch, Stewart, Kolasch & Birch, LLP

(57) ABSTRACT

A battery module including: a battery cell stack in which a plurality of battery cells are stacked; a module frame that houses the battery cell stack; end plates located on first and second surfaces of the battery cell stack; and insertion portions formed on opposite sides of the end plates, the insertion portions being configured to receive ends of moving members configured to be inserted therein.

9 Claims, 8 Drawing Sheets

(58) Field of Classification Search
CPC .... H01M 50/211; H01M 50/50; H01M 50/20;
H01M 50/502; Y02E 60/10
See application file for complete search history.

(56) References Cited

U.S. PATENT DOCUMENTS

| | | | | |
|---|---|---|---|---|
| 2017/0187016 | A1* | 6/2017 | Nagasato | H01M 50/545 |
| 2018/0090729 | A1* | 3/2018 | Cao | H01M 50/291 |
| 2019/0067656 | A1* | 2/2019 | Zhang | H01M 50/289 |
| 2019/0305273 | A1* | 10/2019 | Long | H01M 10/0481 |
| 2019/0348720 | A1 | 11/2019 | Oh et al. | |
| 2019/0389318 | A1 | 12/2019 | Lee et al. | |
| 2020/0014005 | A1 | 1/2020 | Lee et al. | |
| 2020/0343499 | A1 | 10/2020 | Yoo et al. | |
| 2020/0388805 | A1 | 12/2020 | Yoo et al. | |
| 2021/0126313 | A1 | 4/2021 | Lee et al. | |

FOREIGN PATENT DOCUMENTS

| | | | |
|---|---|---|---|
| CN | 106159155 | B | 3/2019 |
| CN | 208898358 | U | 5/2019 |
| CN | 210084712 | U * | 2/2020 |
| JP | 58-134476 | U | 9/1983 |
| JP | 9-175773 | A | 7/1997 |
| JP | 10-25868 | A | 1/1998 |
| JP | 2000-223101 | A | 8/2000 |
| JP | 2012-248485 | A | 12/2012 |
| JP | 2013-45592 | A | 3/2013 |
| JP | 2018-49803 | A | 3/2018 |
| KR | 20-1998-035069 | U | 9/1998 |
| KR | 20-0382949 | Y1 | 4/2005 |
| KR | 10-2012-0056332 | A | 6/2012 |
| KR | 10-2018-0038310 | A | 4/2018 |
| KR | 10-2018-0099438 | A | 9/2018 |
| KR | 10-2019-0063109 | A | 6/2019 |
| KR | 10-2020-0004186 | A | 1/2020 |
| WO | WO2006/083018 | A1 | 8/2006 |
| WO | 2020/055219-1 | | 3/2020 |

OTHER PUBLICATIONS

Lu et al. (CN205294606 (U) as cited in IDS and using Machine Translation as English version) (Year: 2016).*
International Search Report for PCT/KR2021/002698 (PCT/ISA/210) mailed on Jul. 5, 2021.

* cited by examiner

【FIG. 1】
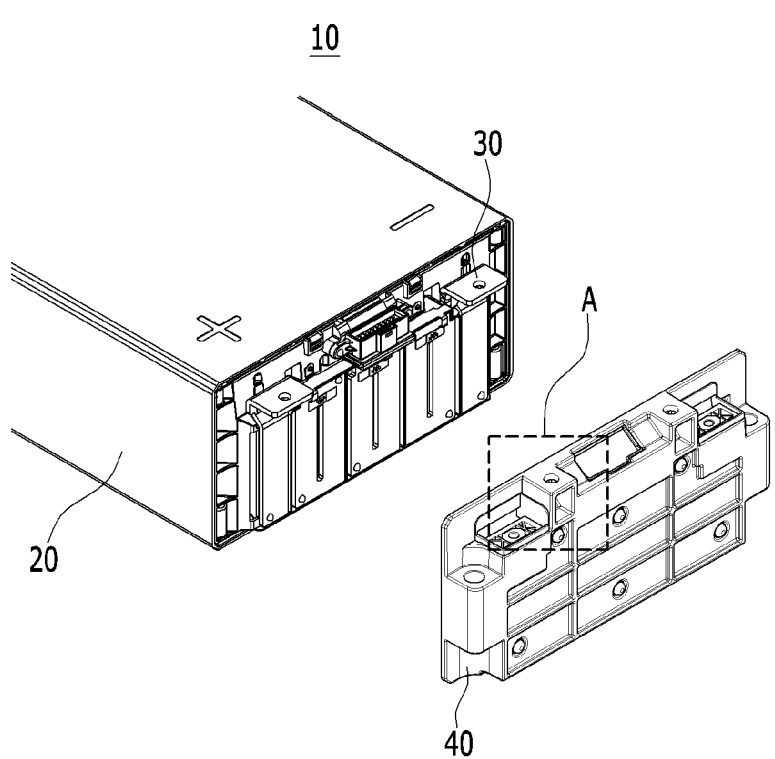

【FIG. 2】
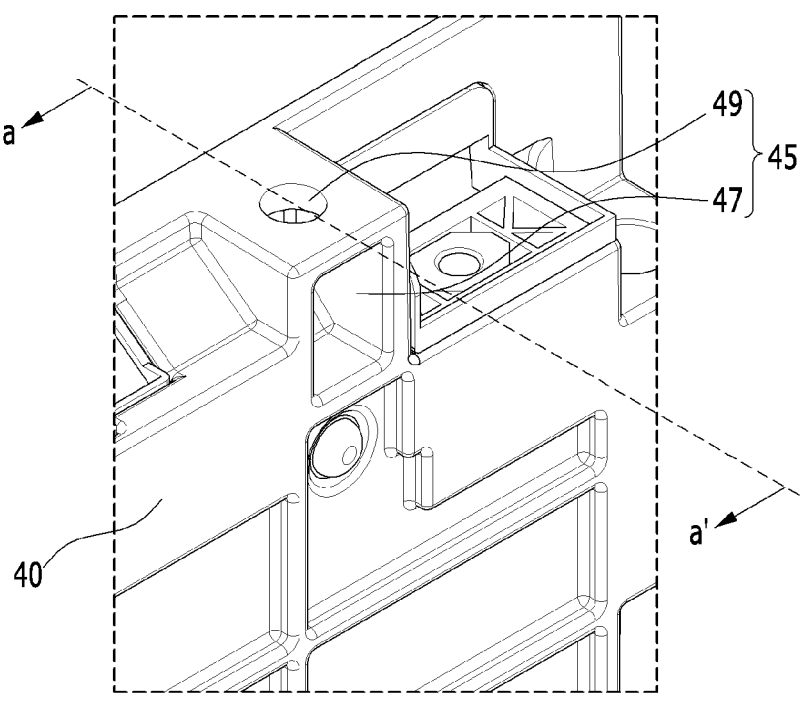
【FIG. 3】
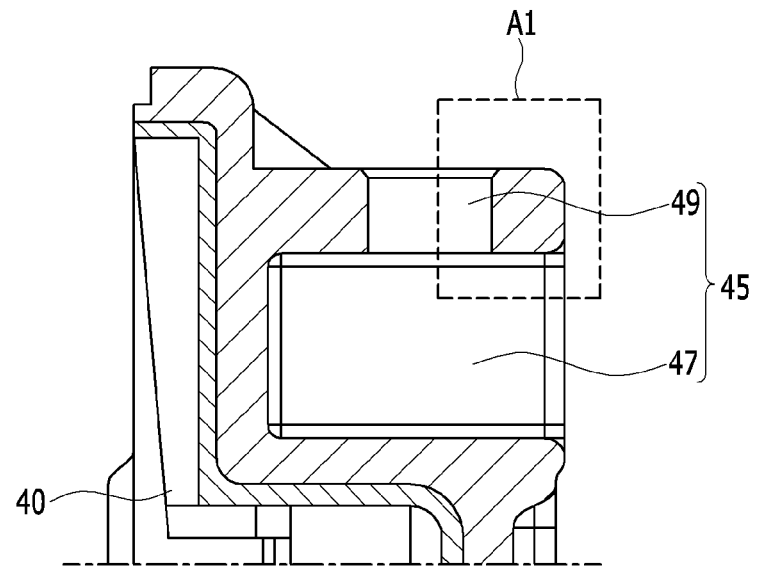

【FIG. 4】
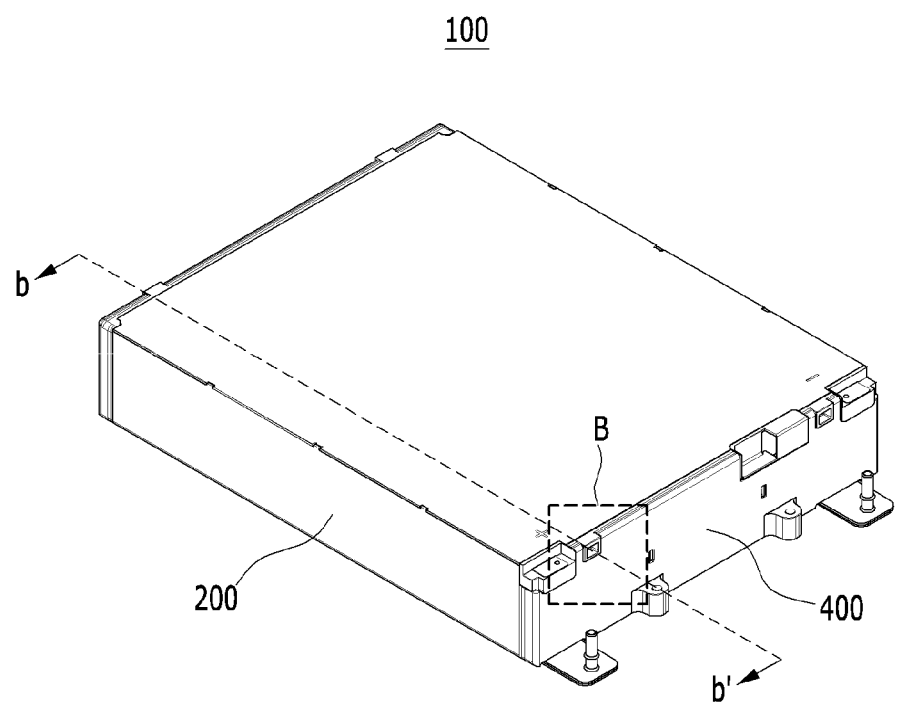

【FIG. 5】
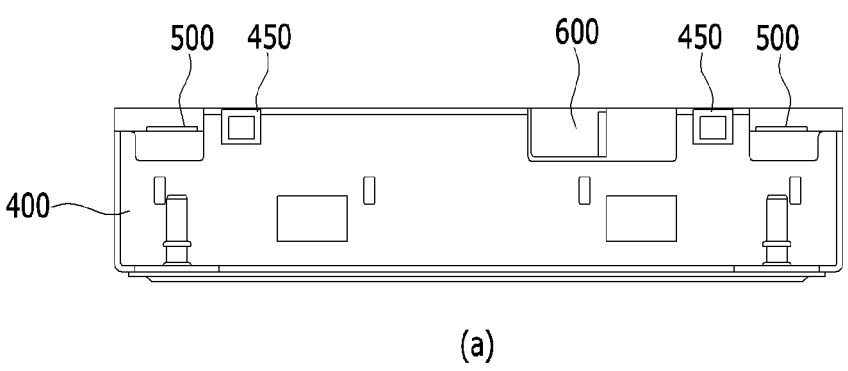
(a)
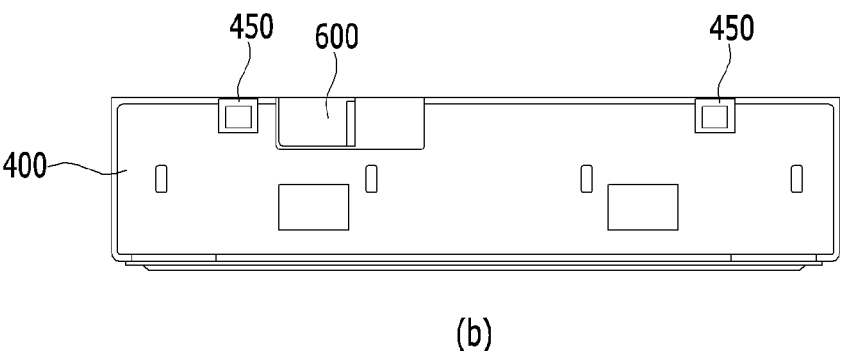
(b)

【FIG. 6】
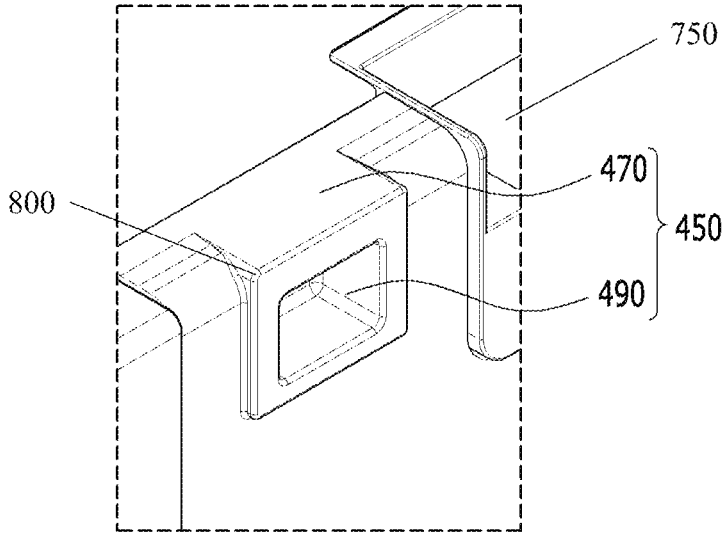
【FIG. 7】
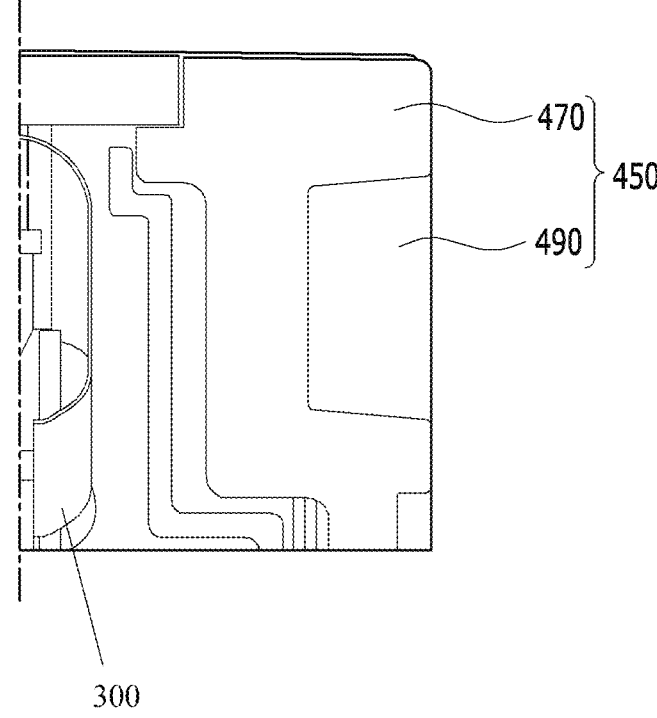

【FIG. 8】
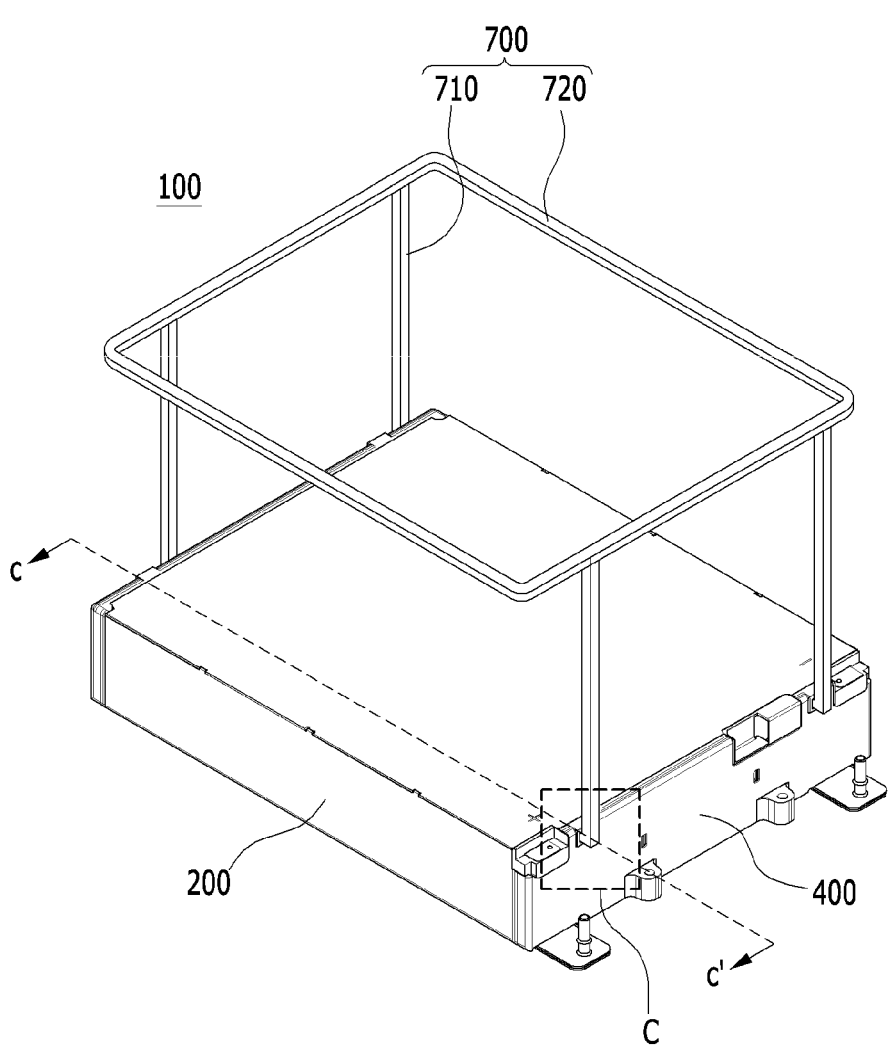

【FIG. 9】
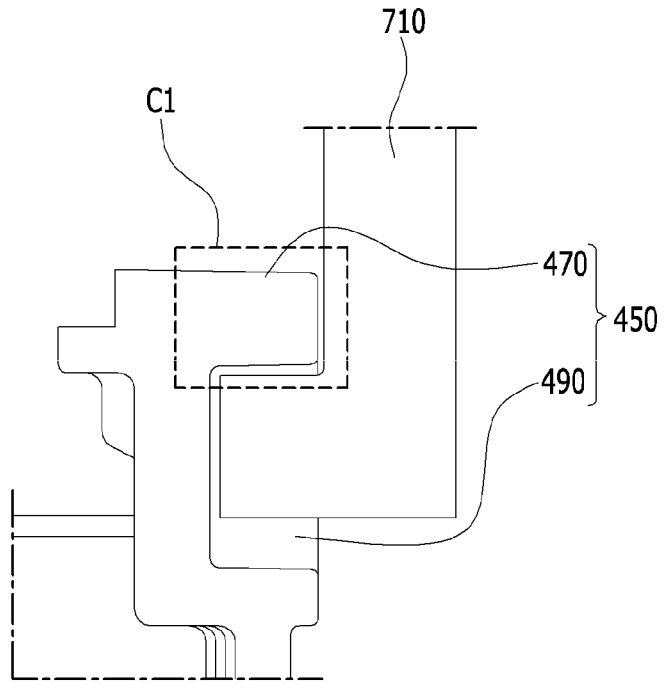
【FIG. 10】
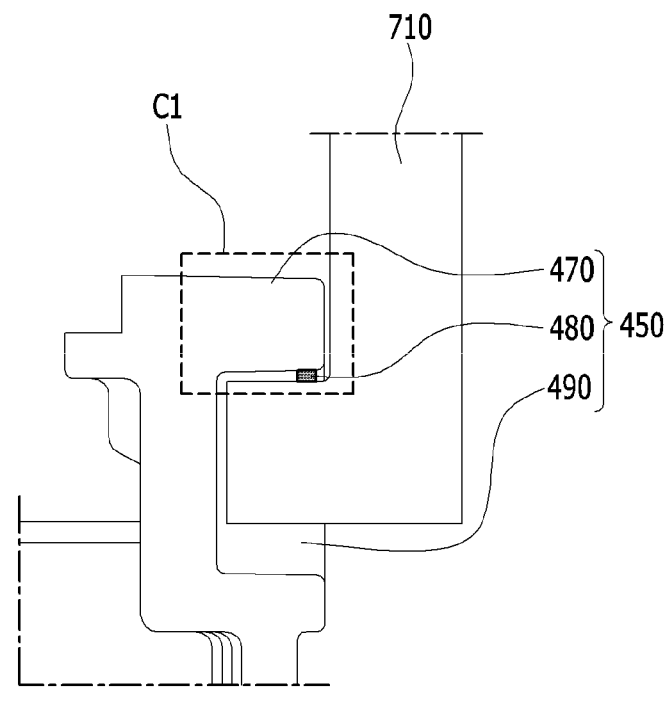

【FIG. 11】
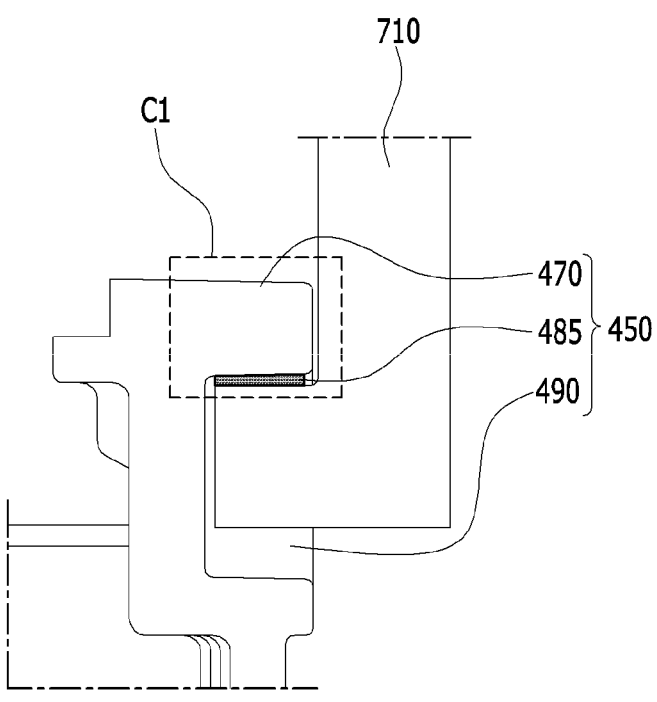

BATTERY MODULE AND BATTERY PACK INCLUDING THE SAME

CROSS CITATION WITH RELATED APPLICATION(S)

This application claims the benefit of Korean Patent Application No. 10-2020-0044966 filed on Apr. 14, 2020 in the Korean Intellectual Property Office, the disclosure of which is incorporated herein by reference in its entirety.

TECHNICAL FIELD

The present disclosure relates to a battery module and a battery pack including the same, and more particularly, to a battery module that is stable and easily movable while preventing damage due to external impact, and a battery pack including the same.

BACKGROUND ART

As technology development and demands for mobile devices increase, the demand for secondary batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Secondary batteries widely used at the present include lithium ion batteries, lithium polymer batteries, nickel cadmium batteries, nickel hydrogen batteries, nickel zinc batteries and the like. An operating voltage of the unit secondary battery cell is about 2.5V to 4.2V. Therefore, if a higher output voltage is required, a battery module is also configured by connecting a plurality of battery cells in series or by connecting a plurality of battery cells in series and in parallel depending on charge/discharge capacity.

When a middle- or large-sized battery module is configured by electrically connecting a plurality of battery cells in series or parallel, pouch-type secondary battery cells having high energy density and being easily stacked are often used, and these cells are stacked to configure a battery cell stack first. Next, it is a commonly used method to configure a battery module by packaging the battery cell stack in a module frame, protecting it, and adding electrical components for the electrical connection and voltage measurement of battery cells. Further, such a battery module can be included in the battery pack, and for this purpose, the battery module needs to be moved. In particular, when the battery module has a specific area and thickness or the load of the battery module is heavy, damage may occur during movement of the battery module.

DETAILED DESCRIPTION OF THE INVENTION

Technical Problem

It is an object of the present disclosure to provide a battery module having a stable and easily movable structure, and a battery pack including the same.

The objects of the present disclosure are not limited to the aforementioned objects, and other objects which are not described herein should be clearly understood by those skilled in the art from the following detailed description and appended claims.

Technical Solution

According to one embodiment of the present disclosure, there can be provided a battery module comprising: a battery cell stack in which a plurality of battery cells are stacked; a module frame that houses the battery cell stack; and end plates located on the front and rear surfaces of the battery cell stack, wherein insertion portions into which the ends of moving members are inserted are formed on both sides of the upper ends of the end plates.

Further, there can be provided the battery module wherein the upper surface of the insertion portion is closed, and the side surface of the insertion portion is opened so that the inside of the insertion portion is exposed.

Further, there can be provided the battery module wherein the inside of the insertion portion is formed in a concave shape so as to correspond to the shape of the end of the moving member.

Further, there can be provided the battery module wherein the inner upper portion of the insertion portion comes into contact with an end of the moving member, and a protrusion is formed at one end of the inner upper portion of the insertion portion.

Further, there can be provided the battery module wherein the inner upper portion of the insertion portion comes into contact with an end of the moving member, and a friction layer is formed on the inner upper surface of the insertion portion.

Further, there can be provided the battery module wherein the insertion portions are formed on the upper portions of both ends of the end plate, respectively.

Further, there can be provided the battery module which further comprises: a busbar frame formed between the front and rear surfaces of the battery cell stack and the end plate; terminal busbars formed on both ends of the busbar frame; and a connector opening to which a connector formed between the terminal busbars is mounted, wherein the insertion portion is formed between the connector opening and the terminal busbar.

Further, there can be provided the battery module wherein the insertion portion is formed at a position adjacent to the terminal busbar.

Further, there can be provided the battery module wherein each apex formed on the outside of the insertion portion is formed in a round square shape.

Further, there can be provided the battery module wherein the inside of the insertion portion is formed in a symmetrical shape.

According to one embodiment of the present disclosure, there can be provided a battery pack comprising the above-mentioned battery module.

Advantageous Effects

According to the embodiments of the present disclosure, an insertion portion into which the moving member can be inserted is formed in the end plate of the battery module, thereby stably moving the battery module without causing any damage. Also, even a battery module having a relatively large load can be stably moved and thus, the cost burden such as equipment and manpower costs can be reduced.

In addition, the insertion portion included in the battery module has a structure capable of being relatively easily coupled and thus, the degree of awareness and attention required for the operator to insert the moving member into the insertion portion can also be lowered. Further, loss of raw materials for forming the insertion portion can be reduced, and the rigidity of the insertion portion can be increased.

The effects of the present disclosure are not limited to the effects mentioned above, and additional other effects not described above will be clearly understood from the following detailed description and appended drawings by those skilled in the art.

BRIEF DESCRIPTION OF THE DRAWINGS

FIG. 1 is a perspective view showing a part of a battery module according to a comparative example.

FIG. 2 is a view showing an insertion hole located in a region A of an end plate of a battery module according to a comparative example.

FIG. 3 is a cross-sectional view taken along the cutting line a-a' with respect to a region A in FIG. 2.

FIG. 4 is a view showing a battery module according to an embodiment of the present disclosure.

FIG. 5 is a view showing end plates located on the front and rear surfaces of the battery module of FIG. 4.

FIG. 6 is an enlarged view showing a region B in FIG. 4.

FIG. 7 is a cross-sectional view taken along the cutting line b-b' with respect to a region B in FIG. 4.

FIG. 8 is a view showing a battery module to which a moving member is coupled according to an embodiment of the present disclosure.

FIGS. 9 to 11 are cross-sectional views taken along the cutting line c-c' with respect to a region C in FIG. 8.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Further, throughout the specification, when a portion is referred to as "including" a certain component, it means that the portion can further include other components, without excluding the other components, unless otherwise stated.

Further, in the figures, the size and thickness of each element are arbitrarily illustrated for convenience of description, and the present disclosure is not necessarily limited to those illustrated in the figures. In the figures, the thickness of layers, areas, etc. are exaggerated for clarity. In the figures, for convenience of description, the thicknesses of some layers and areas are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

In the following, in order to describe the battery module according to an embodiment of the present disclosure, a comparative example will be first described. However, the description herein is made based on the front surface of the front and rear surfaces of the battery module, but is not necessarily limited thereto, and even in the case of the rear surface, the same or similar contents may be described.

FIG. 1 is a perspective view showing a part of a battery module according to a comparative example.

Referring to FIG. 1, the battery module 10 according to a comparative example includes a battery cell stack (not shown) formed by stacking a plurality of battery cells, a module frame 20 for housing the battery cell stack, busbar frames 30 located on the front and rear surfaces of the battery cell stack, and end plates 40 for covering the front and rear surfaces of the battery cell stack.

As an example, the module frame 20 may be in the shape of a mono frame as shown in FIG. 1. Also, the module frame 20 may include a U-shaped frame (not shown) of which an upper surface, a front surface and a rear surface are opened, and an upper plate (not shown) that covers an upper portion of the battery cell stack. That is, the module frame 20 is not limited to the above-mentioned contents, and can be replaced with a frame having another shape such as an L-shaped frame.

FIG. 2 is a view showing an insertion hole located in a region A of an end plate of a battery module according to a comparative example. FIG. 3 is a cross-sectional view taken along the cutting line a-a' with respect to a region A in FIG. 2.

Referring to FIGS. 2 and 3, the battery module 10 has at least one insertion hole 45 through which a moving member for moving the battery module 10 is inserted in an upper portion of the end plate 40.

Further, the insertion hole 45 includes a penetration region 47 which penetrates in a direction perpendicular to the end plate 40, and whose one side is opened, and an opening region 49 which penetrates in a direction parallel to the end plate 40, and whose both sides are opened.

As an example, the moving member may be a handling jig and a lifting jig. At this time, an end of the handling jig may be inserted into the penetration region 47, and a ring formed at the end of the handling jig may be hooked and fixed in the opening region 49. Therefore, the end of the handling jig is inserted into the insertion hole 45 and fixed, so that the battery module 10 can be moved to a desired position by the lifting jig of the moving member.

However, since the insertion hole 45 formed in the end plate 40 as in the comparative example includes not only the penetration region 47 but also the opening region 49, the insertion hole 45 may have a higher risk of being damaged as the load of the battery module 10 is relatively increased. This is because the load of the battery module 10 is applied to a first region A1 shown in FIG. 3. The first region A1 is a region between the opening region 49 and the penetration region 47 in which a ring formed at the end of the handling jig is hooked.

Further, the insertion hole 45 includes not only the penetration region 47 but also the opening region 49 and thus, the durability of the insertion hole 45 can be reduced, and the risk of damage due to external impact can be increased.

Further, a separate device may be required in order to lock the hook formed at the end of the handling jig in the first region A1 of the insertion hole 45. In this way, the manpower cost and time cost required for the preliminary work associated with the movement of the battery module 10 may be increased.

Further, since the insertion hole 45 must additionally perform a separate process for forming the opening region 49 together with the penetration region 47, the manufacturing cost and the manufacturing time can be further increased.

Thereby, the battery module according to an embodiment of the present disclosure has an end plate having an insertion portion which allows the battery module to more efficiently and stably move by the moving member.

Hereinafter, with respect to the battery module according to an embodiment of the present disclosure, a portion having a difference as compared with the above-mentioned comparative example will be described in detail.

FIG. 4 is a view showing a battery module according to an embodiment of the present disclosure. FIG. 5 is a view showing end plates located on the front surface (a) and the rear surface (b) of the battery module of FIG. 4.

Referring to FIGS. 1, 4, and 5, the battery module 100 is configured such that the battery cell stack is covered by the module frame 200, and the front and rear surfaces of the battery cell stack are covered by the end plate 400. According to the present embodiment, the battery module may have a large-area module structure in which the number of battery cells included in the battery cell stack increases significantly as compared with the prior art. Therefore, in a large-area module structure, the load of one battery module is greatly increased and thus, the risk of damage during movement can increase.

Therefore, the battery module 100 according to the present embodiment may have at least one insertion part 450 configured so that a moving member for moving the battery module 100 is inserted into at least a partial region of the end plate 400. In particular, the battery module 100 may be configured so as to form an insertion portion 450 in the region B of the end plate 400 as shown in FIG. 4, and the insertion portion 450 may be formed at positions corresponding to each other on the front and rear surfaces of the battery module 100.

Further, two or more insertion portions 450 may be formed on the end plate 400, and the insertion portion 450 may be formed at a position symmetrical to each other. Therefore, when the moving member is inserted into the insertion portion 450 and moved, the battery module 100 can stably move as the center of gravity of the battery module 100 is evenly distributed.

In addition, the insertion portion 450 may be formed adjacent to the upper portion or the lower portion of the end plate 400, and two or more insertion portions 450 may be formed at positions symmetrical to each other. In particular, since the insertion portion 450 may be formed adjacent to the upper portion of the end plate 400, the other configuration of the battery module 100 formed on the end plate 400 can be prevented from being damaged due to a preliminary work in which the moving member is inserted into the insertion unit 450.

As an example, the battery module 100 may have a busbar frame 300 formed between the battery cell stack (not shown) and the end plate 400, and the end plate 400 may have at least a part of the terminal busbars 500 formed at both ends. Further, the end plate 400 may have a connector opening 600 to which a connector 750 is mounted between the terminal busbars 500. At this time, the insertion portion 450 may be formed at a position between the terminal busbar 500 and the connector opening 600. Further, the terminal busbar 500 may be formed at a position between two or more insertion portions 450. In particular, the insertion portion 450 is located between the terminal busbar 500 and the connector opening 600, but may be formed closer to the terminal busbar 500. Consequently, in particular, the insertion portion 450 may be formed closer to the side surface of the upper portion of the end plate 400. Thus, the center of gravity of the battery module 100 can be evenly distributed to be stably moved, and the other configuration of the battery module 100 formed on the end plate 400 can be prevented from being damaged due to a preliminary work in which the moving member is inserted into the insertion part 450.

However, the insertion portion 450 is not limited to the above-mentioned position, and it can be arranged without limitation even at any position as long as the battery module 100 can be stably moved by the coupling of the insertion portion 450 and the moving member.

FIG. 6 is an enlarged view showing a region B in FIG. 4. FIG. 7 is a cross-sectional view taken along the cutting line b-b' with respect to a region B in FIG. 4.

Referring to FIGS. 4, 6 and 7, the insertion portion 450 may include a protrusion region 470 and a concave region 490. The insertion portion 450 may have a shape in which the protrusion region 470 surrounds the concave region 490.

Here, the protrusion region 470 is protruded in a direction perpendicular to one surface of the end plate 400, and the concave region 490 may be formed so as to be concave in a direction perpendicular to one surface of the end plate 400. Further, the protrusion region 470 may be formed in a square shape in which each apex 800 formed on the outer side is rounded. Further, the concave region 490 may be formed in a symmetrical shape. Further, the concave region 490 may be formed in a shape corresponding to an end of the moving member described later. Further, the protrusion region 470 has a specific thickness, and no hole region may be formed in any of the regions. In the embodiment of the present disclosure, the side surface of the insertion portion 450 is opened and thus, the inside of the insertion portion 450 can be exposed. The inside of the insertion portion 450 may be formed to be concave so as to correspond to the shape of the end of the moving member.

This allows the insertion portion 450 to minimize the influence on the rigidity exerted by the hole region and thus, the insertion portion 450 can reduce the degree of damage even when a moving member described later is coupled to the insertion portion 450 or an external impact is applied. Further, the insertion portion 450 has relatively improved rigidity and thus, can stably move the battery module 100 having a larger load.

Further, the insertion portion 450 includes a protrusion region 470 and a concave region 490 and thus, the insertion portion 450 may be more conveniently coupled to the moving member than a comparative example in which the ring coupling is performed. Further, unlike a comparative example in which the ring coupling is performed, the insertion portion 450 can simplify the coupling process of the movable member in that the moving member is inserted into the concave region 470 of the insertion portion 450 to perform a hook coupling. Therefore, the degree of awareness and attention required of the operator in the process of coupling the moving member may also be reduced. In addition, manpower cost, time cost, and space cost required in the process of coupling the moving member can be reduced.

However, the insertion portion 450 is not located to be limited to the above-mentioned shape, and even any shape can be arranged without limitation as long as the battery module 100 has a shape that can be stably moved by the coupling of the insertion portion 450 and the moving member.

FIG. 8 is a view showing a battery module to which a moving member is coupled according to an embodiment of the present disclosure. FIGS. 9 to 11 are cross-sectional views taken along the cutting line c-c' with respect to a region C in FIG. 8.

Referring to FIGS. 4, 8, and 9, the battery module 100 may be moved by the moving member 700. As an example, the moving member 700 may include a coupling portion 710 and a support portion 720. The moving member 700 may be coupled in such a manner that it is hooked and supported by the insertion portion 450. In particular, the battery module 100 may be moved as the support portion 720 is moved to a desired position in a state where the coupling portion 710 of the moving member 700 is hooked by the insertion portion 450.

Here, the battery module 100 is configured such that the load of the battery module 100 may be applied in the second region C1 corresponding to the coupling portion 710 of the moving member 700 in the insertion portion 450. Unlike the comparative example described in FIGS. 1 to 3, a hole region is not formed in the second region C1 and thus, the load of the battery module 100 may be evenly distributed in the second region C1. Therefore, as the battery module 100 having a larger load than the comparative example also has the insertion part 450 formed therein, it is stably moved by the moving member 700, and the possibility of damage due to the movement can be reduced. As an example, in the battery module 100 having the insertion portion 450 according to the embodiment of the present disclosure, the battery module 100 having a load of twice or more that of the comparative example can be stably moved.

As an example, the end of the second region C1 of the insertion portion 450 may be formed to more extend in a vertical direction to the end plate 400 compared to the opposite end corresponding thereto, if necessary. As the end of the second region C1 of the insertion portion 450 more extends in the vertical direction to the end plate 400, the load of the battery module 100 applied to the second region C1 may be more distributed. Further, the area of the second region C1 in contact with the moving member 700 is increased accordingly, so that a frictional force between the moving member 700 and the second region C1 may be greater. Accordingly, the insertion portion 450 can stably move the battery module 100 having a larger load by the moving member 700.

As another example, referring to FIG. 10, the inside of the insertion portion 450 may be formed at a position where the protrusion 480 corresponds to the end of the second region C1, if necessary. As the protrusion 480 is formed at the end of the second region C1 of the insertion portion 450, a coupling force between the moving member 700 and the protrusion 480 can also be formed in addition to the frictional force between the moving member 700 and the second region C1. Accordingly, the insertion portion 450 may more stably move the battery module 100 having a larger load by the moving member 700.

As another example, referring to FIG. 11, the inside of the insertion portion 450 may be formed at a position corresponding to the second region C1 of a friction layer 485, if necessary. As the friction layer 485 is formed in the second region C1 of the insertion portion 450, the frictional force between the moving member 700 and the second region C1 may be greater. Accordingly, the insertion portion 450 may more stably move the battery module 100 having a larger load by the moving member 700.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200: module frame
400: end plate
450: insertion member
700: moving member

The invention claimed is:

1. A battery module comprising:
a battery cell stack in which a plurality of battery cells are stacked;
a module frame that houses the battery cell stack;
end plates located on first and second surfaces of the battery cell stack; and
insertion portions formed on opposite sides of the end plates, the insertion portions being configured to receive ends of moving members configured to be inserted therein,
wherein an upper surface of an insertion portion of the insertion portions is closed,
wherein a side of the insertion portion is opened so that an inside of the insertion portion is exposed,
wherein the inside of the insertion portion includes a side wall that is opposite to the opened side, and the side wall is also closed,
wherein the insertion portion has a concave region with an opening in a lateral direction of the battery module, and the concave region does not have an opening in a height direction of the battery module, the lateral direction and the height direction being perpendicular to each other,
wherein an inner upper portion of the insertion portion comes into contact with an end among the ends of the moving members, and a protrusion is formed on an inner surface of the concave region at only the inner upper portion of the insertion portion, or a friction layer is formed on the inner surface of the concave region on only the inner upper portion of the insertion portion, and
wherein when the end among the ends of the moving members is inserted into the insertion portion, a gap is disposed between the end and a lower surface of the concave region so that the end of the ends of the moving members can be inserted and removed from the concave region in a presence of the protrusion or the friction layer.

2. The battery module according to claim 1,
wherein the inside of the insertion portion is formed in a concave shape so as to correspond to a shape of the end among the ends of the moving members.

3. The battery module according to claim 1,
wherein the insertion portions are formed on upper portions of the opposite sides of the end plates, respectively.

4. The battery module according to claim 1, further comprising:
a busbar frame formed between the first and second surfaces of the battery cell stack and the end plates;
terminal busbars formed on opposite ends of the busbar frame; and
a connector opening to which a connector formed between the terminal busbars is mounted,
wherein the insertion portions are formed between the connector opening and the terminal busbars.

5. The battery module according to claim 4, wherein the insertion portions are formed at a position adjacent to the terminal busbars.

6. The battery module according to claim 1, wherein a protrusion region is formed at a periphery of the insertion portion, and the protrusion region includes a plurality of apexes formed on an outside of the insertion portion, and wherein each apex formed on the outside of the insertion portion is rounded.

7. The battery module according to claim 1, wherein the inside of the insertion portion is formed in a symmetrical shape.

8. A battery pack comprising the battery module according to claim 1.

9. The battery module according to claim 1, wherein a thickness of an upper region of the insertion portion is greater than a thickness of a lower region of the insertion portion.

* * * * *